United States Patent [19]

Groh et al.

[11] Patent Number: 5,132,530
[45] Date of Patent: Jul. 21, 1992

[54] LIGHT DETECTOR BASED ON FLUORESCENT DYES

[75] Inventors: Werner Groh, Frankfurt am Main; Jochen Coutandin, Langenlonsheim; Peter Herbrechtsmeier, Königstein/Taunus; Jürgen Theis, Frankfurt am Main, all of Fed. Rep. of Germany

[73] Assignee: Hoechst Aktiengesellschaft, Fed. Rep. of Germany

[21] Appl. No.: 762,556

[22] Filed: Sep. 18, 1991

Related U.S. Application Data

[63] Continuation of Ser. No. 412,334, Sep. 26, 1989, abandoned.

[30] Foreign Application Priority Data

Sep. 28, 1988 [DE] Fed. Rep. of Germany ....... 3832803

[51] Int. Cl.⁵ .............................................. H01J 5/16
[52] U.S. Cl. .................. 250/227.31; 385/121

[58] Field of Search ............ 250/227.31, 227.32, 250/368, 474.1; 385/115, 120, 121

[56] References Cited

U.S. PATENT DOCUMENTS

| | | | |
|---|---|---|---|
| 4,175,980 | 11/1979 | Davis et al. | 250/227.31 |
| 4,193,819 | 3/1980 | Wohlmut | 250/227.31 |
| 4,371,897 | 2/1983 | Kramer | 250/227.31 |
| 4,472,046 | 9/1984 | Kohyama | 250/227.31 |
| 4,650,992 | 3/1987 | Ruhrmann . | |

Primary Examiner—David C. Nelms
Attorney, Agent, or Firm—Connolly & Hutz

[57] ABSTRACT

A light detector consists of a plate-like light-absorbing body and at least one optical waveguide connected thereto. Both parts of the light detector contain a fluorescent dye, whereby the irradiated light is converted into a fluorescence radiation. This radiation is guided by total reflection to a light-sensitive semiconductor element and is measured there. The light detector is suitable as light barrier, fiber-optic revolution counter or UV detector.

5 Claims, 2 Drawing Sheets

LIGHT DETECTOR BASED ON FLUORESCENT DYES

The present application is a continuation of application Ser. No. 412,334 filed Sep. 26, 1989, now abandoned.

DESCRIPTION

The invention relates to a light detector based on fluorescent dyes, which are embedded in transparent polymer foils and fibers.

It is known that in the case of the lateral irradiation of light into an optical waveguide containing fluorescent dyes fluorescence radiation is generated, which can be guided by total reflection to the end faces of the optical waveguide (cf. Tanaka et al., SPIE, Vol. 840 "Fiber Optic Systems for Mobile Platforms", p. 19).

The object consisted in finding a light detector which, as a result of its large detector surface, is insensitive to contaminations and does not require any electrical supply lines at the location of the reception of the light.

Accordingly, the invention relates to a light detector, consisting of a plate-like light-absorbing body and at least one optical waveguide connected thereto.

The plate-like light-absorbing body can have any selectable form; preferably it is round or rectangular, especially round. It can be a plate or foil, or can consist of a flat bundle of optical waveguides, which, in turn, can be fused together into a plate. Preferably, it is a plate or foil. The thickness is 0.1 to 5 mm, preferably 0.25 to 1.0 mm. The plate-like body consists of a transparent polymer, for example of polycarbonate, polyvinyl chloride, polystyrene or polymethyl methacrylate.

To the plate-like light-absorbing body there is connected at least one optical waveguide, which is preferably attached at one edge. The optical waveguide can end at the edge or be attached along the edge. Preferably, the optical waveguide is attached along the edge; it thus surrounds the plate-like body at its narrow side.

The optical waveguide can be a commercially conventional fiber, which preferably consists of a transparent polymer, for example polycarbonate, polystyrene or polymethyl methacrylate in the core and a polymer sheath with a lower refractive index, preferably a fluorinated acrylate.

Expediently, the optical waveguide is as thick as the plate-like body; preferably it is 0.25 to 1.0 mm thick. A single optical waveguide can also be replaced by a bundle of optical waveguides.

The plate-like body and the optical waveguide contain in each instance at least one fluorescent dye; in this case, the wavelength range of the emission of the plate dye must overlap the wavelength range of the absorption of the optical waveguide dye. In the case of the optical waveguide, the dye can be situated both in the core and also in the sheath or in both. Suitable fluorescent dyes are, in particular, organic compound for example perylene dyes, benzoxanthenes, or alternatively inorganic compounds, for example zinc sulfide.

If light of suitable wavelength, e.g. from a lamp or a light-emitting diode, impinges on the plate-like body, then in the body fluorescence light is emitted, which is guided by total reflection to the edge with high efficiency. The total reflection takes place at both platelike body/air boundary surfaces. However, the plate-like body can also be coated with a transparent polymer coating with lower refractive index. At the edge of the plate-like body, the fluorescence light impinges on the light guide fiber with high intensity. If the dyes in the body and fiber are coordinated with one another so that the spectral emission range of the body dye is in agreement with the spectral absorption range of the light guide fiber dye, then the light from the plate-like body generates fluorescence radiation in the optical waveguide, which fluorescence radiation is guided, on its part, by total reflection and emerges at the ends of the optical waveguide. A light-sensitive semiconductor element is situated there, for example a silicon diode, which detects the radiation. The diode can be of small area and therefore of low noise.

In order to avoid a possibly disturbing irradiation of the optical waveguide with extraneous light, the optical waveguide can be surrounded, on the side remote from the plate-like body, with an absorbing coating, e.g. a black metal foil. Transparent coatings for protection from mechanical or chemical stress or for the control of the total reflection can be applied to the plate-like body or the optical waveguide. In order to transmit the optical signal to the semiconductor element over a greater distance, lower-attenuation optical waveguides consisting of polymer or glass can be attached to the end of the fluorescence optical waveguide.

The figures show examples of preferred embodiments of the light detector according to the invention.

Advantages of the detector according to the invention are:

Very large sensitive surface possible, which can, in addition, be designed in any arbitrary manner by appropriate masking of the film surface. Non-transparent metal foils or adhesive foils can, for example, be used for the masking.

Very small overall depth of the detector, down to approximately 0.1 mm.

Purely optical operation, i.e. no electrical supply lines are required at the location of the light detection. Thus, use in Ex-regions is also possible.

On account of the large sensitive surface, the detector is insensitive to contaminations. Accordingly, it is very suitable for applications in light barriers and fiber-optic revolution counters.

No or only slight adjustment effort on account of the large detector surface.

Good sensitivity also with large-area light sources, as a result of the large detector surface.

Light detection from both sides of the plate-like body is possible. In the event that the useful light enters only from one side, the other side can be covered with a non-transparent coating.

By appropriate selection of the dye concentration, it is possible to detect only a small part of the measurement light, but to allow the main part to be transmitted through the detector for further tests. The detector can therefore be used as intensity or time reference.

The spectral sensitivity of the detector is selective in the region of the absorption of the fluorescent dye of the plate-like body, and can be matched to the measurement problem by selection of this dye.

By series connection of a plurality of plate-like bodies which are doped with different fluorescent dyes, light from various spectral regions can be separated and selectively detected. As a result of this, it is possible to use the detector as receiver in arrangements in which digitally encoded information is transmitted by different wavelengths in an optical waveguide and the wavelength channels must be separated for reading out the information at the receiver (wavelength multiplex).

EXAMPLE 1

Figure 1:
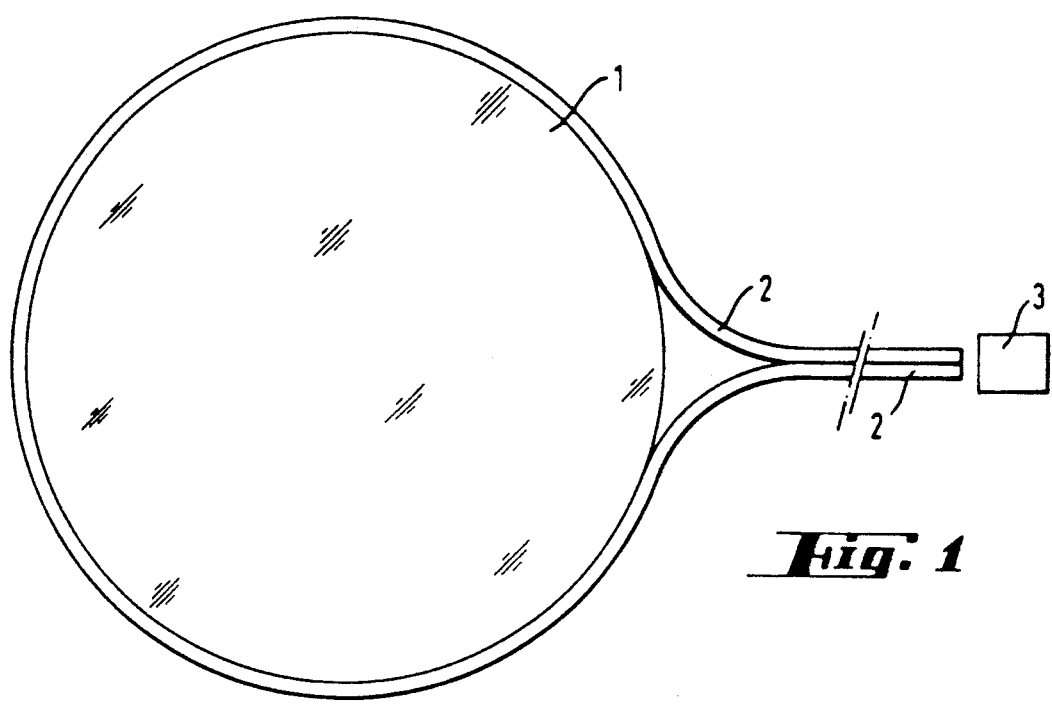
FIG. 1 shows a light detector, in which a thin round plate (1) is clamped at the edge by an optical waveguide (2), the two ends of which lead to a light-sensitive semiconductor element (3).

A round polycarbonate foil (0.45 mm thick, diameter 60 mm) doped with a green organic fluorescent dye was surrounded, in accordance with FIG. 1, by an optical waveguide, the polycarbonate core of which was doped with a red fluorescent dye. The emission range of the foil was at 460–620 nm, with a maximum at 500 nm. The absorption range of the optical waveguide dye was in the range from 500–600 nm, with a maximum of 570 nm. The emission took place in the range 590–720 nm, and the emission maximum was at 610 nm. The detector was irradiated by a lamp at a distance of 2 m, and could in this manner be used as light barrier, which indicated the interruption of the light beam when a person passed through. In addition, the relative sensitivity of the detector was determined as a function of the location of the light irradiation from the foil. It became evident that the detector was very homogeneous and the indicated intensity fluctuated only within ±5% over the entire surface.

EXAMPLE 2

Figure 2:
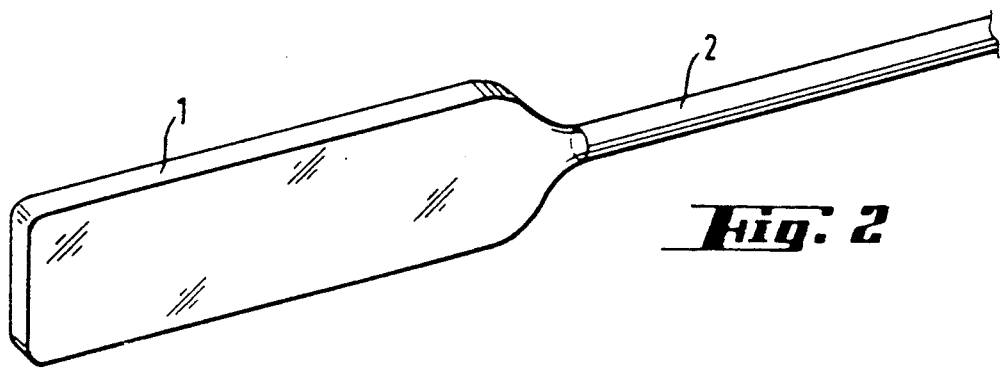
FIG. 2 shows a light detector, in plastic plate (1) doped with a fluorescent dye was cemented to an optical waveguide (2).

A PMMA optical waveguide having a diameter of 1 mm was applied, on the narrow side, according to FIG. 2, to a small PMMA plate which had a width of 1 cm, a height of 0.5 cm and a thickness of 1 mm and which was doped with a fluorescent dye. The dye had its absorption maximum at 560 nm; the emission maximum was at 605 nm. The small plate was brought in front of a rotating disk with an aperture, and was irradiated from the other side of the disk with a green light-emitting diode ($\lambda = 565$ nm). This arrangement represented an optical revolution counter, in which the speed of rotation of the disk is determined by measurement of the periodic interruption of the light beam.

EXAMPLE 3

PMMA optical waveguides having a diameter of 1 mm were doped in the sheath with fluorescent pigments consisting of $CaSiO_3:Mn,Pb$ or $ZnS:Cu$. The sheath consisted of a fluorinated methacrylate with a refractive index of 1.42. Mn;Pb and Cu respectively were added as sensitizers in order to accomplish the optimal excitation of the pigment in the wavelength range $<320$ nm or at 320–400 nm. When UV light having these wavelengths was irradiated, red and green fluorescence light respectively was generated and guided to the fiber ends. When the red-emitting fiber illuminated, UV radiation $<320$ nm was detected, which is known as UV-B radiation, and in the case of relatively lengthy irradiation of the skin can cause malignant tumors.

When the other fiber, which was sensitive in the range 320–400 nm, was excited to luminescence, harmless UV-A radiation was present. This was indicated by green light at the fiber end. This leads to the obtaining of a simple UV detector for monitoring solaria and sun-beds.

Figure 3:
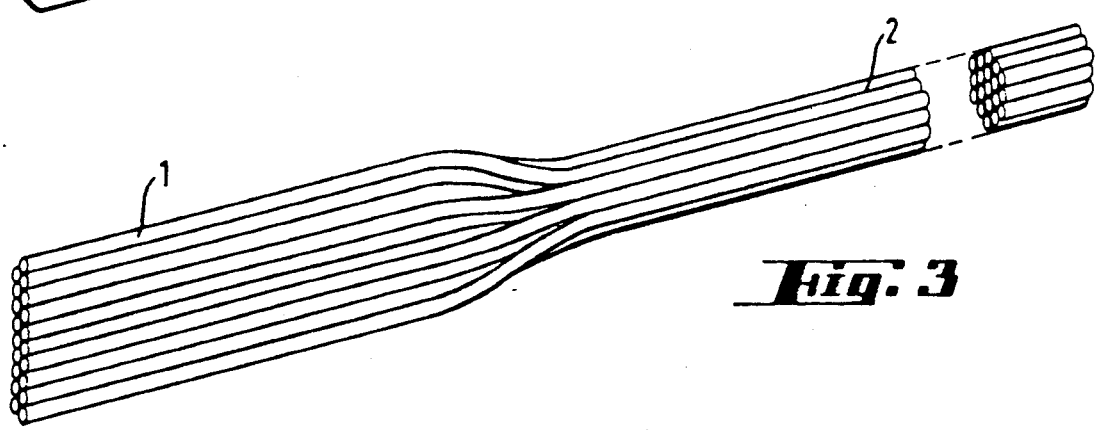
FIG. 3 shows a light detector, in which the plate-like body (1) consists of a flat bundle of optical waveguides and merges directly into a bundle of optical waveguides (2).
Figure 4:
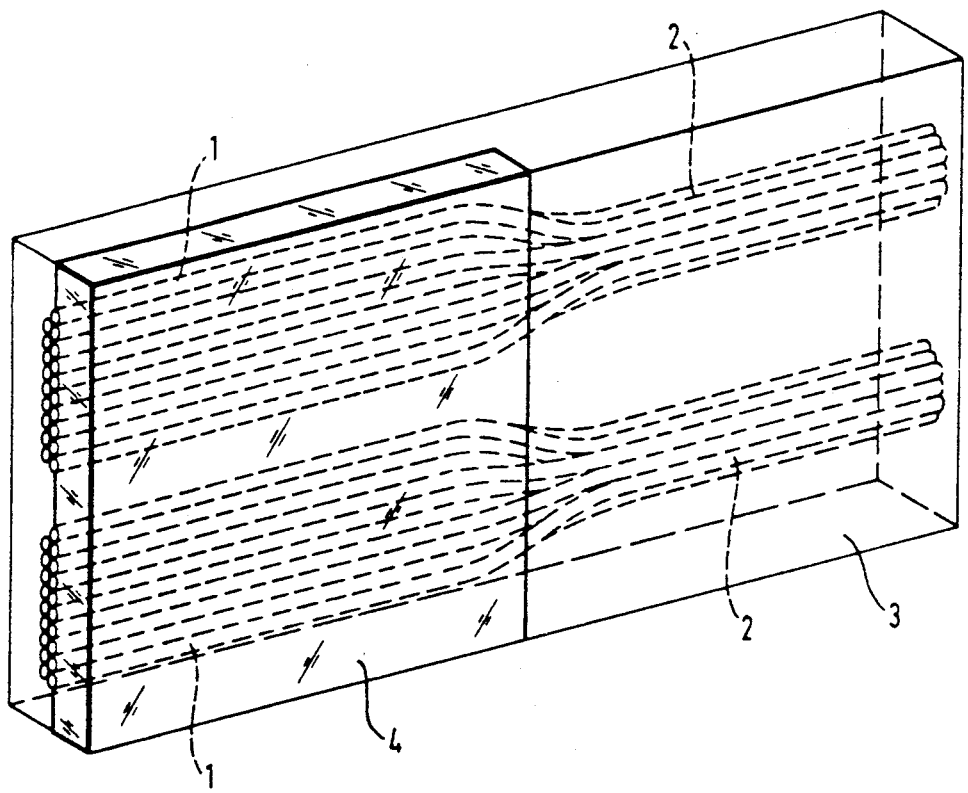
FIG. 4 shows two light detectors according to FIG. 3, which consist in each instance of a plate-like body (1) consisting of a flat bundle of optical waveguides, which merges directly into a round bundle of optical waveguides (2), and are embedded, disposed parallel, in a block (3) consisting of a transparent cast resin. The lateral surface (4) of the block (3) is sensitive to UV radiation.

A practical principle of implementation of such a detector consists in that a red-emitting detector according to FIG. 3 and a similar detector which emits green are disposed parallel and embedded in a block consisting of a transparent cast resin; in this case, a lateral face of the block is sensitive to UV light, cf. FIG. 4.

We claim:

1. A light detector, consisting essentially of a flat plate-like light-absorbing body and at least one optical waveguide having fibers attached at an edge of the flat plate-like body, and light being coupled into the fibers at their longitudinal side by absorption and remission of the dye contained in the fibers.

2. The light detector as claimed in claim 1, wherein the flat plate-like body has a thickness of 0.1 to 5 mm.

3. The light detector as claimed in claim 1, wherein the flat plate-like body has a thickness of 0.1 to 5 mm.

4. The light detector as claimed in claim 1, wherein the flat plate-like body and optical waveguide essentially consist of a transparent polymer and a fluorescent dye.

5. The light detector as claimed in claim 1 wherein the flat plate-like light-absorbing body has two opposite and parallel faces.

* * * * *

UNITED STATES PATENT AND TRADEMARK OFFICE
CERTIFICATE OF CORRECTION

PATENT NO. : 5,132,530
DATED : July 21, 1992
INVENTOR(S) : Werner Groh, et. al.

It is certified that error appears in the above-indentified patent and that said Letters Patent is hereby corrected as shown below:

Column 2, line 34, after "in" insert -- which a small --.

Signed and Sealed this

Seventeenth Day of August, 1993

Attest:

BRUCE LEHMAN

Attesting Officer

Commissioner of Patents and Trademarks